Oct. 23, 1945.   W. H. FARR   2,387,504
TRAILER
Filed April 25, 1944   2 Sheets-Sheet 1
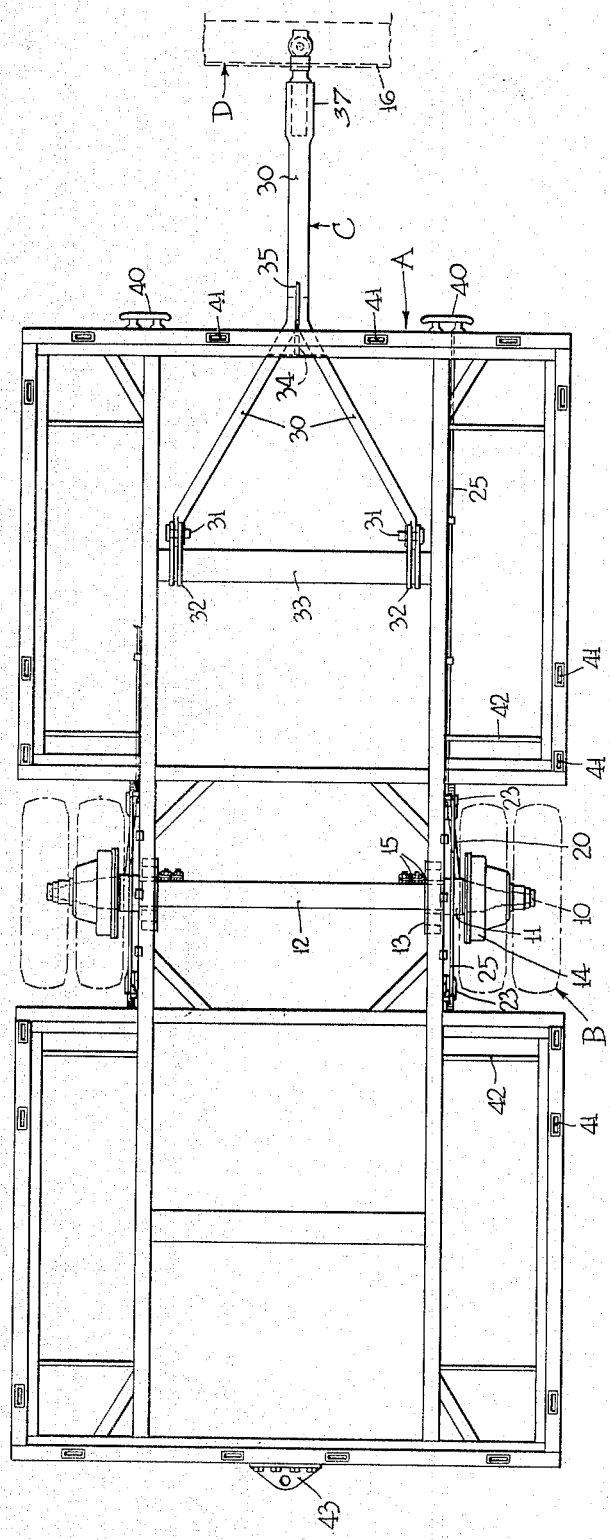
INVENTOR
Warren H. Farr,
BY John P. Tarbox
ATTORNEY INVENTOR
Warren H. Farr, BY John P. Tarbox
ATTORNEY Patented Oct. 23, 1945

2,387,504

UNITED STATES PATENT OFFICE 2,387,504

TRAILER

Warren H. Farr, Grosse Pointe Farms, Mich., assignor to Budd Wheel Company, Philadelphia, Pa., a corporation of Michigan Application April 25, 1944, Serial No. 532,574

3 Claims. (Cl. 280—33.4)

This invention relates to trailers and has for an object the provision of improved apparatus and method for raising and lowering the trailer frame relative to the wheel axle.

The objects and advantages of the invention will be understood from the following description and accompanying drawings, wherein:

Fig. 1 is a top plan view of a trailer embodying the invention;

Fig. 2 is a side elevation of the same;

Figure 3:
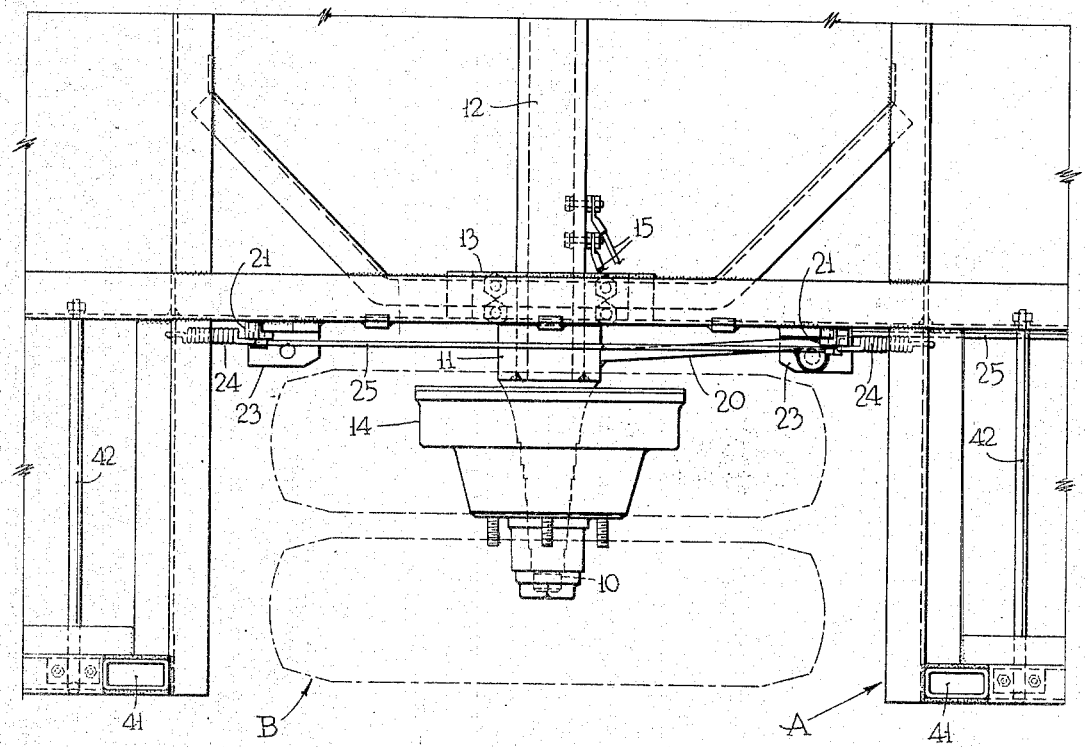
Fig. 3 is an enlarged partial plan view.

The trailer includes a frame A, wheels B, and a draft gear C. The trailer illustrated is a two-wheel vehicle having no power drive, but the invention may be applied to any vehicle with any number of wheels which at the time of elevation shift is being moved horizontally.

The wheels B are rotatably mounted on axles 10 carried by arms 11 fast on a transverse shaft 12 which is turnably mounted in bearings 13 carried on the body frame. The wheels are provided with brakes 14, preferably of the remote-control type, which can be operated through flexible connectible cables 15 from the cab of a power vehicle D of any type appropriate to the use of the trailer. Only the draft portion 16 of the power vehicle is herein shown and for purposes of reference it will be assumed that the power vehicle is a farm tractor.

Figure 4:
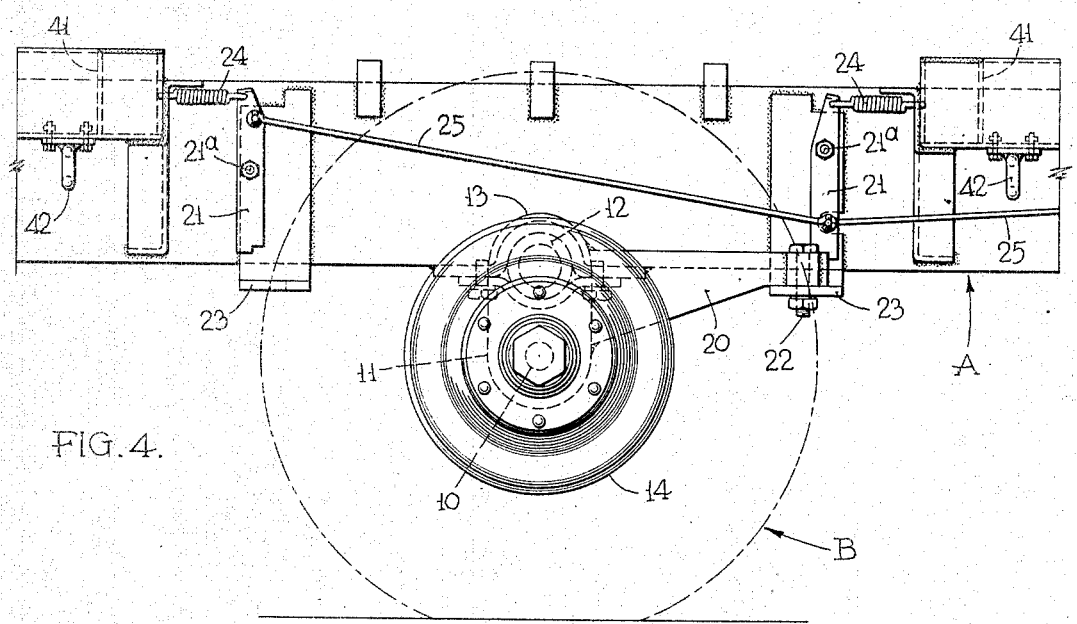
Fig. 4 is a corresponding elevation.

The wheel mounting provides means for shifting the frame or body from one elevation to another. In Figs. 2 and 4 it is shown in highest position and is here held by an arm 20 fast on the cross shaft 12, the arm being held securely in this one of its plural adjusted positions by a latch 21 or a bolt 22 or both. Only two adjusted positions are provided in the illustrated form, that where the frame is in its highest position with the shaft 12 above the axles 10, as shown in Figs. 2 and 4, or where it is in its lowest position with the shaft 12 below the axles 10 which is 180° removed from the illustrated position. In either of its two positions the arm 20 rests upon one of two stop brackets 23 secured to the frame. The latches 21 are each swingably mounted on a pivot pin 21a, are each biased by a spring 24, and are operated by a rod 25. The rod (or rods) is shown extending to the front end of the frame, where it is provided with a handle 26; and it may be extended, as by a flexible cable 27, to the cab of the power vehicle. The rods for the two sides are also preferably connected in common for operation of both from one or both sides.

The method of changing the elevation of the frame is to apply the brakes and move the frame horizontally, the latch arm 20 being released by the rod 25 (and the bolt 22 being removed, if used), whereupon the wheels turn about the axis of shaft 12 as they grip the ground and roll the required distance therealong to swing the arm 20 from one bracket to the other. Under these conditions the controlled movement of the power vehicle D, or other translating power means, accurately controls the change in elevation of the trailer frame. The length of the arms 11, the friction of the wheels on the ground, and the amount of tractive effort determine the amount of load that can be lifted but since the arm 11 is never very long and since the tractive effort and wheel-ground friction are usually quite large the load which can be lifted or lowered is relatively great. If the normal ground surface does not provide enough friction it is very easy to provide obstructions upon which the wheels must climb to give the necessary resistance to slippage. With an arm which comes against fixed stops, as illustrated the trailer will be moved in opposite directions for raising and lowering.

The draft gear C comprises a yoke 30 pivoted in its V arms upon pins 31 carried by brackets 32 secured to a cross frame member 33. A latch 34 having a handle 35 and a spring 36 normally holds the front end of the yoke to the frame. When unlatched, the front end of the body can be swung up to place the frame in an inclined position. In the inclined position, also, the frame may be raised and lowered, if desired, a strut spacer or connector being placed between the frame and yoke.

At the front end, the yoke is provided with a hitch 37 which includes the usual universal connectors and shock absorbers. The details of this hitch are not important here but it is to be noticed that an upper and a lower mounting position are provided to place the yoke and trailer frame in generally horizontal position in the raised and lowered positions.

By way of explanation, the trailer frame includes tie-downs 40, side frame post sockets 41, outboard floor braces 42, and a rear trailer hitch anchorage 43.

Assuming the parts to be in the position shown in Figs. 2 and 4 with the frame in the upper position, to shift the frame A to the lower position it is only necessary to apply the brakes, remove the bolt 22 (if used), operate the latches 21 by pulling the rod 25 to release the arm 20, and then move the trailer against the action of the brakes, as by the tractor D, until the arm 25 swings over against the other bracket 23 and is caught thereon by the other latch 21. It may there be bolted if desired for greater safety. If it is desired that the frame A be approximately horizontal, the hitch 37 may be reversed in position, as indicated in Fig. 2, though this is not necessary for the raising and lowering of the trailer frame. To shift back to the illustrated position the procedure is repeated.

If the latch 35 is in the released position, the rear end of the body may be lowered to the ground and the floor will stand at an upward inclination toward the front end, the inclination, of course, being less when the wheel axles 10 are in their upper position than when they are in their lower position. In this inclined position the floor of the body constitutes a ramp over or upon which material may be loaded. For example, a tractor, live stock, or other live load may be moved up the ramp. Suitable sides are mounted in the sockets or stake straps 41 when needed, in accordance with usual practice. As stated above, if the front end of the body needs to be held up against tipping over when loaded too heavily forward of the wheels, a strut or spacer may be placed between the front end and the yoke or draft gear 30 or between the front end and the ground, platform, or the like. An automobile jack is usually available for this purpose and this has the advantage of quickly being adjusted to different lengths.

If the load does not balance over the wheels or overbalance to bring down the front end of the body, the front end may readily be brought down by pulling forward on the yoke 30. And if this still does not tilt the body forward, the brakes may be applied and this will force the body to tilt when the trailer is pulled forward. The arrangement thus, not only provides total lift and drop upon the wheels, but as well provides partial lift or drop of the body in that its inclination can be controlled.

It is thus seen that the invention provides an improved trailer construction and an improved method of operating the same whereby the frame may be quickly and controllably raised and lowered by power which is available for traction, and this without any power take-off mechanism or complicated connections or controls. And while one embodiment of the invention has been described, it is to be understood that there may be various embodiments within the limits of the prior art and the scope of the subjoined claims.

What is claimed is:

1. A roadway vehicle comprising in combination, a body, a supporting wheel therefor mounted to turn selectively about concentric and eccentric axes, the body being mounted on the eccentric axis, braking means for the wheel for retarding or stopping its rotation about its concentric axis, means for selectively holding or freeing the wheel for turning movement about its concentric axis, and means for selectively holding or freeing the wheel for movement about its eccentric axis, whereby upon applying tractive force to the vehicle while holding the wheel against turning movement about its concentric axis and freeing it for movement about its eccentric axis the body is raised or lowered, and while freeing the wheel for turning movement about its concentric axis and holding it against movement about its eccentric axis the vehicle is moved along on its wheel as a rotating support.

2. A roadway vehicle comprising in combination, a body, a shaft on which the body is turnably supported, a crank arm carried by said shaft and carrying a crank axle having its axis parallel to and spaced from the axis of said shaft, a wheel rotatably mounted on said axle, brake means between said wheel and crank arm and means for holding said crank arm in different turned positions, whereby upon applying tractive force to the vehicle while holding the wheel by its brake against turning movement about its concentric axis and freeing it to turn with the crank arm about the shaft as an eccentric axis the body is raised or lowered, and while freeing the wheel for turning movement about its concentric axis and holding it against movement about its eccentric axis by securing the crank arm in a fixed position by its holding means the vehicle is moved along on its wheel as a rotating support.

3. A roadway vehicle as set forth in claim 2, which further includes in combination, draft gear on the body through which the tractive force may be applied from an extraneous power device such as a tractor.

WARREN H. FARR.